United States Patent
Mattheis (10) Patent No.: US 7,578,135 B2
(45) Date of Patent: Aug. 25, 2009

(54) RECESSED CLIMATE CONTROLLER

(76) Inventor: Steven G. Mattheis, P.O. Box 4203, 490 Arapahoe La., Jackson, WY (US) 83001

( * ) Notice: Subject to any disclaimer, the term of this patent is extended or adjusted under 35 U.S.C. 154(b) by 429 days.

(21) Appl. No.: 10/996,206

(22) Filed: Nov. 23, 2004

(65) Prior Publication Data

US 2006/0108432 A1    May 25, 2006

(51) Int. Cl.
| G01K 13/00 | (2006.01) |
| F25B 49/00 | (2006.01) |
| F24F 7/00 | (2006.01) |
| G05D 23/12 | (2006.01) |

(52) U.S. Cl. .......................... 62/129; 62/125; 236/49.3; 236/1 C (58) Field of Classification Search ................. 236/1 C, 236/47, 49.3, 94, 681; D10/49, 50, 51; 62/125, 62/126, 129, 159, 161, 163
See application file for complete search history.

(56) References Cited

U.S. PATENT DOCUMENTS

| 2,075,873 | A | * | 4/1937 | Strand ......................... 361/158 |
| 2,196,842 | A | | 4/1940 | Strazzabosco .............. 173/330 |
| 3,238,338 | A | | 3/1966 | Nelson ........................ 200/138 |
| 3,928,716 | A | | 12/1975 | Marrero ....................... 174/57 |
| 4,273,957 | A | | 6/1981 | Kolling, Jr. .................... 179/1 |
| 5,023,396 | A | | 6/1991 | Bartee et al. .................. 174/48 |
| 5,485,954 | A | | 1/1996 | Guy et al. ...................... 236/78 |
| 5,488,347 | A | | 1/1996 | Gurski ......................... 337/380 |
| 5,558,436 | A | | 9/1996 | Richards ...................... 374/208 |
| 5,603,451 | A | | 2/1997 | Helander et al. ............... 236/51 |
| 6,032,867 | A | | 3/2000 | Dushane et al. ................ 236/51 |
| 6,046,405 | A | | 4/2000 | Obermann .................... 174/57 |
| 6,098,411 | A | * | 8/2000 | Jeon ............................. 62/125 |
| D447,963 | S | | 9/2001 | Ingebritson .................. D10/50 |
| 6,478,587 | B2 | | 11/2002 | Sharples ...................... 439/131 |
| 6,604,798 | B1 | | 8/2003 | Cooney .................... 312/223.1 |
| D530,633 | S | * | 10/2006 | Moore .......................... D10/49 |
| D536,274 | S | * | 2/2007 | Rosenblatt .................. D10/106 |
| 2003/0052502 | A1 | * | 3/2003 | Schmidt et al. ........... 296/37.13 |

OTHER PUBLICATIONS

IEEE, "IEEE 100, The Authoritative Dictionary of IEEE Standards Terms", Dec. 2000, Standards Information Network, IEEE Press, Seventh Edition, pp. 1026 and 1198.*

* cited by examiner

Primary Examiner—Chen-Wen Jiang
(74) Attorney, Agent, or Firm—Westman, Champlin & Kelly, P.A.

(57) ABSTRACT

A climate controller is mounted to a wall having an exterior surface. The climate controller includes a mounting bracket recessed within the wall and having a cavity therein. A faceplate is mounted to the mounting bracket and has an opening aligned with the cavity and wherein the face place is juxtaposed the exterior surface of the wall. A control module is positionable within the mounting bracket and wherein the control module comprises a control panel. When the control module moves in a first direction, the control panel is accessible through the opening in the faceplate. When the control module moves in an opposite direction, the control panel concealed from view through the opening and a visual impact of the climate controller in relation to the wall is minimized.

37 Claims, 5 Drawing Sheets

RECESSED CLIMATE CONTROLLER

BACKGROUND OF THE INVENTION

The present invention relates to a climate controller for controlling ambient conditions in a building or living space. More particularly, the present invention relates to a climate controller that is recessed into a wall to minimize an adverse aesthetic impact of the climate controller in the building or living space.

Wall mounted climate controllers such as thermostats are used in virtually every modern building to control an interior temperature within the building or living space. The thermostat senses the temperature within a space and compares the temperature to a predetermined setpoint. Based upon the difference between the setpoint and the actual temperature, the thermostat sends a signal to heating, ventilation and/or air conditioning units (HVAC) to adjust the temperature of the space. When the actual temperature is approximately equal to the setpoint, the thermostat will send a signal to shut down the HVAC equipment.

Wall mounted thermostats have become efficient at accurately controlling the temperature of a living space, and have greatly contributed to comfort levels for persons within the space. Thermostats also contribute in the effort to conserve energy. However, many people do not find thermostats to be aesthetically appealing. While necessary, most architects and building occupants find wall mounted thermostats to be an eyesore. Many thermostats extend into the living space from the wall, thereby adding clutter to the view and probably do not match the architectural design of the space.

Some thermostats are mounted generally flush with the wall, thereby eliminating some of the eyesore. However, the controls and the display screen are visible and thereby detract from the visual aesthetics of the space.

SUMMARY OF THE INVENTION

The present invention includes a climate controller for mounting to a wall having an exterior surface. The climate controller includes a mounting bracket recessed within the wall and having a cavity therein. A faceplate is mounted to the mounting bracket and has an opening aligned with the cavity and wherein the face place is juxtaposed the exterior surface of the wall. A control module is positionable within the mounting bracket and wherein the control module comprises a control panel. When the control module moves in a first direction, the control panel is accessible through the opening in the faceplate. When the control module moves in an opposite direction, the control panel is concealed from view through the opening and a visual impact of the climate controller in relation to the wall is minimized.

DETAILED DESCRIPTION OF THE PREFERRED EMBODIMENTS

Figures 1, 1A, 2:
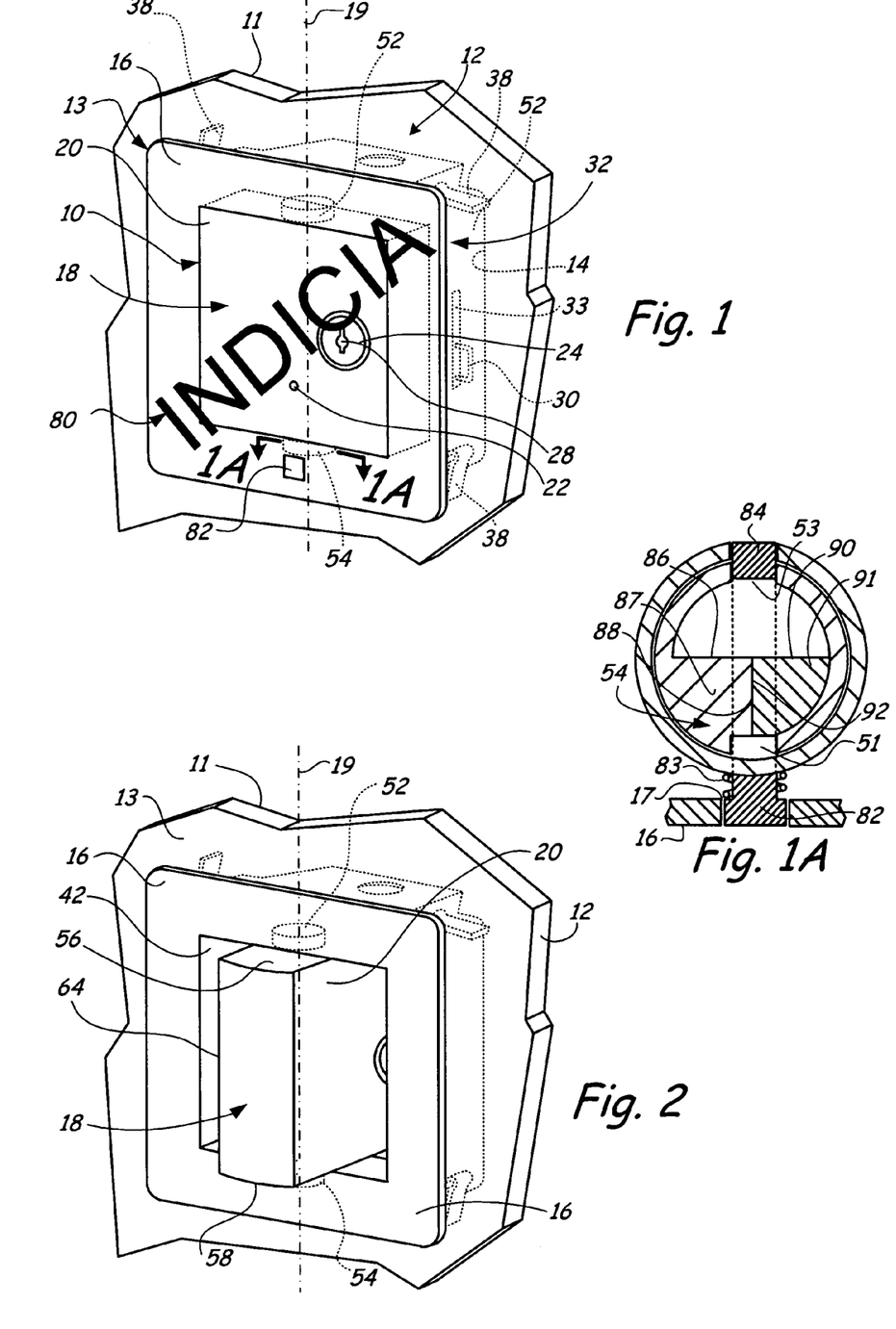
FIG. 1 is a perspective view of the temperature controller of the present invention having a viewing panel accessible to an operator in a living space.
FIG. 1A is a sectional view of a stopping mechanism along section line 1A-1A in FIG. 1.
FIG. 2 is a perspective view of a climate controller of the present invention wherein a control module is being rotated within a mounting bracket.

A climate controller of the present invention is generally illustrated at 10 in FIG. 1. The climate controller 10 is recessed within an opening 14 in a wall 12 to minimize the aesthetic impact of the climate controller 10 on the wall 12.

A preferred climate controller 10 is a thermostat for controlling a temperature. However, other climate control devices are within the scope of the present invention, including but not limited to, a humidistat. Throughout this application, the climate controller 10 will be referred to as a thermostat 10. However, the use of the term thermostat is not to be construed as limiting of the scope of the present invention.

The thermostat 10 of the present invention minimizes the aesthetic impact on a room by having only two visible components, a faceplate 16 and a viewing panel 20 of a control module 18. The faceplate 16 and the viewing panel 20 of the control module 18 are substantially flush with each other, having only a seam between the faceplate 16 and the control module 18. The face plate 16 and the viewing panel 20 create a single generally smooth surface that minimizes the aesthetic impact of the thermostat 10 on the wall 12. By aesthetic impact is meant the impact of the thermostat on the appearance of a space, a room or a wall.

The single generally smooth surface is interrupted by a temperature sensor 22 that preferably extends an effective distance into the room to determine a temperature of the room from the viewing panel 20. However, the size, color and a length of the sensor 22 that extends from the generally smooth surface is designed to minimize the adverse aesthetic impact of the temperature sensor 22 within the viewing panel 20. It is also within the scope of the present invention for the temperature sensor 22 to be recessed or flush mounted into the viewing panel or alternatively positioned within the faceplate 16. The temperature sensor 22 also may be remotely located away from the thermostat 10.

An exterior surface of a lock 24 also interrupts the generally smooth surface of the viewing panel 20 of the control module 18. The lock 24 includes a key hole 28 into which a key (not shown) is inserted. The key is rotated and thereby rotates a latch 30 within a slot 33 in a mounting bracket 32 that prevents rotational movement of the control module 18. However, any locking mechanism is within the scope of the present invention.

The lock 24 is not required to practice the present invention. However, the lock 24 may be useful in eliminating unauthorized personnel from readjusting the temperature setpoint on the thermostat 10 which may increase energy costs, especially in a commercial or public building.

Referring to FIGS. 1-5, the faceplate 16 is removably attached to the mounting bracket 32 that is positioned within the opening 14 in the wall 12. Preferably, the faceplate 16 includes magnets that attract to the mounting bracket 32 which is preferably a constructed from a magnetic ferrous metal. However, other attachments of the face plate 16 to the mounting bracket 32 are within the scope of the present invention.

The mounting bracket 32 is secured to the wall 12 by positioning a plurality of tabs 34 that extend outwardly from a front edge 36 in contact with an exterior surface 13 of the wall 12 and engaging a plurality of wings 38 that extend beyond the perimeter of the mounting bracket 32 with an interior surface 11 of the wall 12. The plurality of wings 38 are generally located at the four corners of the mounting bracket 32. Each of the plurality of wings 38 are threadably engaged with threaded bolts 40 that are rotated and engage threaded bores 41 in the wings 38 to draw the wings 38 into contact with the interior surface 11. As the wings 38 are drawn into contact with the interior surface 11, a frictional engagement between the plurality of wings 38, the wall 12 and the plurality of tabs 34 is created which secures the mounting bracket 32 to the wall 12.

Referring to FIGS. 1, 2, 5 and 6, the control module 18 is positioned within a cavity 42 in the mounting bracket 32 defined by a top wall 44, left and right side walls 46, 48, respectively, and a bottom wall 50. Top and bottom pegs 52, 54 extending from top and bottom surfaces 56, 58, respectively, of the control module 18 are positioned within a generally circular cross-sectional aperture 60 in the bottom wall 50 and a generally circular cross-sectional aperture 62 in a plate 63 proximate to and substantially parallel to the top wall 44 of the mounting bracket 32. The apertures 60, 62 are generally aligned and accept the top and bottom pegs 52, 54 that are positioned generally along a vertical axis 19 of the control module 18. With the pegs 52, 54 positioned within the apertures 60, 62, the control module 18 is rotatably secured within the mounting bracket 32 and is rotatable about the vertical axis 19. It is also within the scope of the present invention for the control module 18 to be rotatably attached to the mounting bracket 32 such that the control assembly 18 rotates about a horizontal axis.

Referring to FIGS. 1, 1A, 5 and 6, the control module 18 is rotated about the vertical axis 19 by disengaging a latch 84 from a first slot 53 in the bottom peg 54 of the control module 18 by depressing a push button 82 accessible through an aperture 17 in the faceplate 16. With the latch 84 disengaged from the first slot 53, a coil spring 72 having a first end 76 attached to the control module 18 and a second end 74 attached to the mounting bracket 32 uncoils which forces the control module 18 to rotate about the vertical axis 19.

The control module 18 continues to rotate until a first surface 86 of a first pie shaped stop 87 extending from the bottom peg 54 engages a first surface 90 of a pie shaped stop 91 extending from the mounting bracket 32 within the aperture 60. The abutting first surfaces 86, 90 stop the control module 18 from rotating and the latch 84 engages a second slot 51 opposite the first slot 53 to retain the control module 18 in the selected position.

Figure 3:
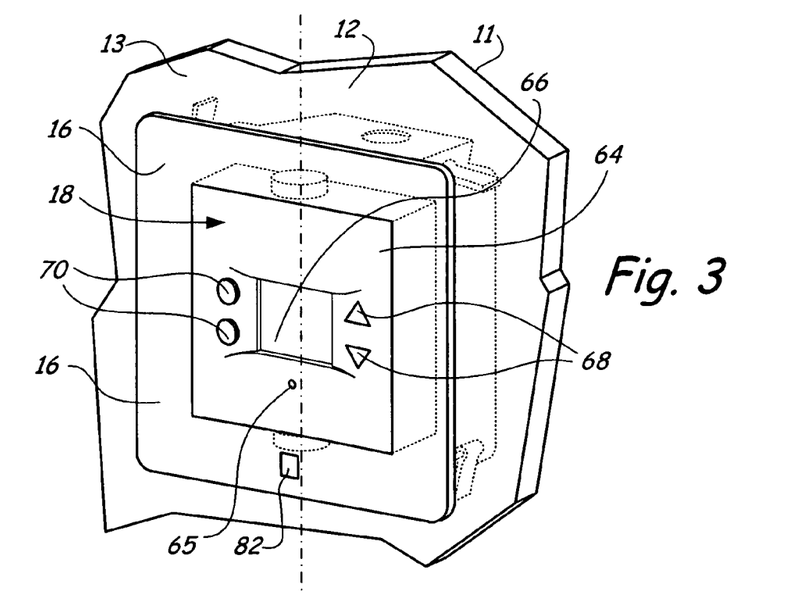
FIG. 3 is perspective view of the climate controller of the present invention wherein a control panel is accessible to an operator in a living space.

Referring to FIG. 3, with the first surfaces 86, 90 abutting, the control panel 64 is accessible through the opening in the faceplate 16. The control panel 64 allows the temperature set point to be adjusted as well as program whether the building is set to a heating or cooling.

Figure 4:
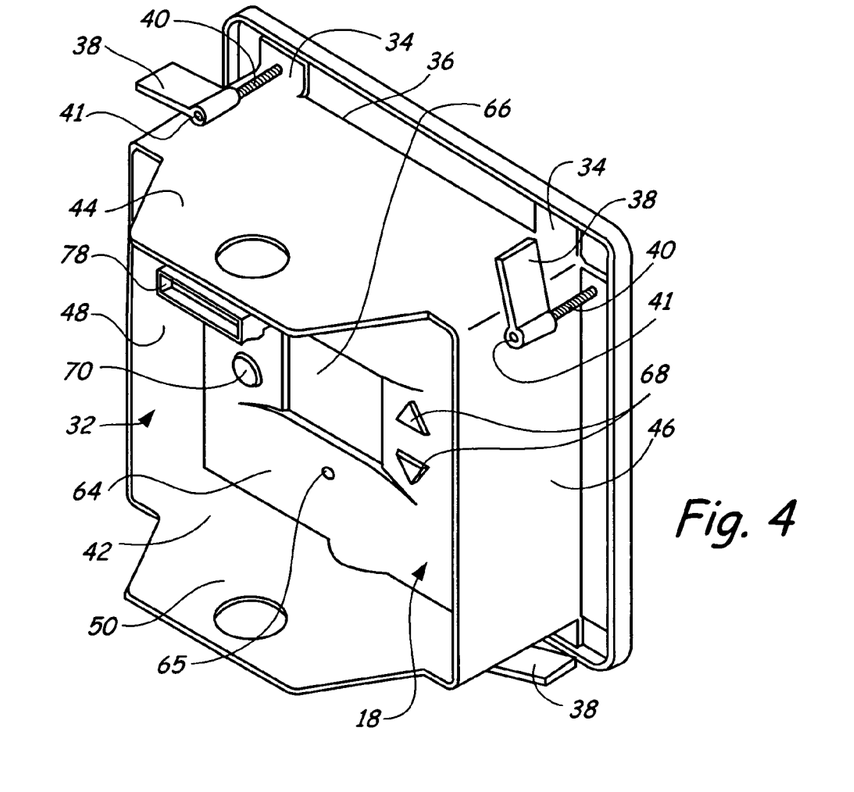
FIG. 4 is a perspective view of the climate controller of the present invention as viewed from a backside thereof.
Figure 5:
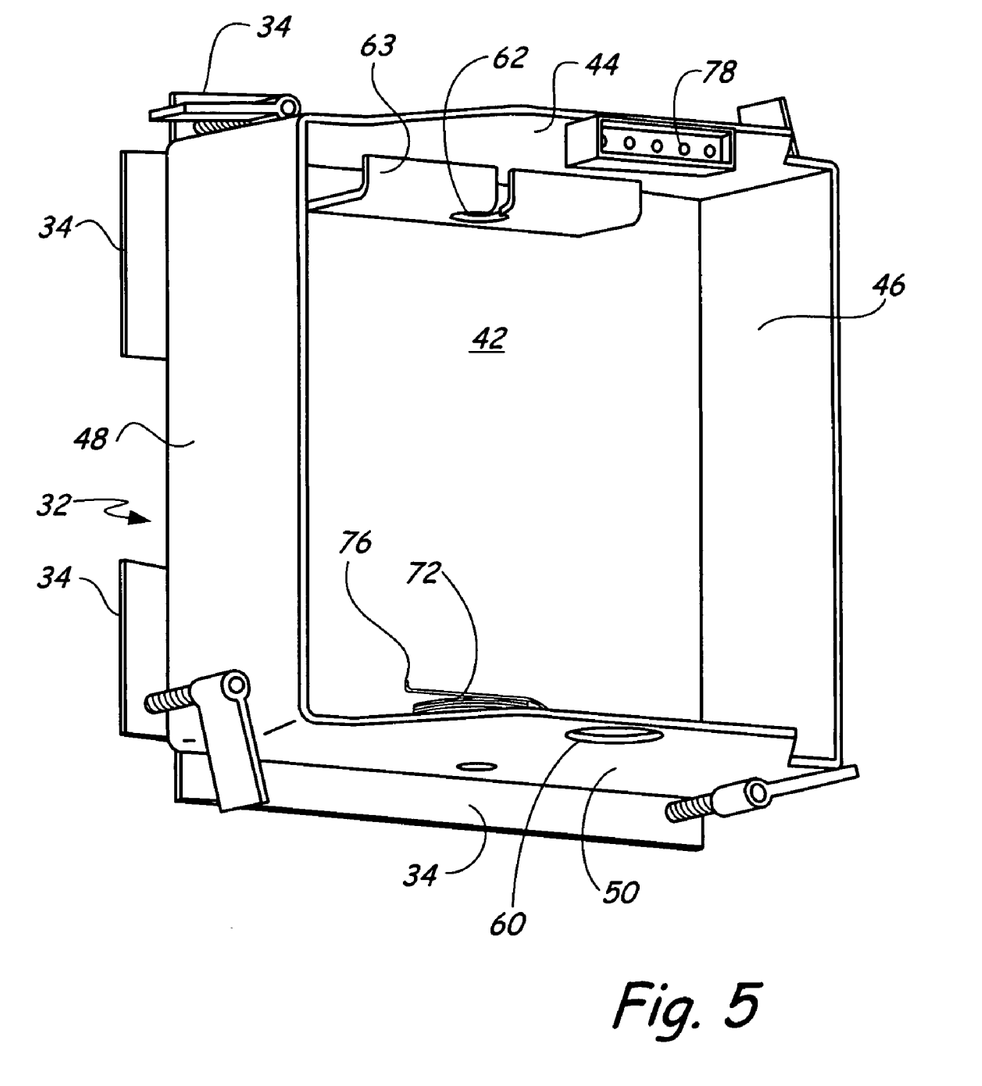
FIG. 5 is another perspective view of the mounting bracket of the present invention viewed from a backside thereof.

Referring to FIGS. 3 and 4, the control panel 64 includes a display screen 66 for determining the temperature set point, the actual temperature as well as whether the thermostat is in a heating or cooling mode of operation. The screen display 66 is preferably a liquid crystal display (LCD). A display may also be contained within the viewable panel 20 so that the room temperature may be ascertained without having to manipulate the position of the control module 18.

The control panel 64 preferably contains a first set of control push buttons 68 that manipulate a first controller and are manipulated to raise and lower the temperature setpoint. The control panel 64 also preferably contains a second set of control push buttons 70 that manipulates a second controller which is used to change the mode of operation of the thermostat from a heating mode to a cooling mode or vice versa. Additionally, the second set of push buttons 70 allow the ventilation equipment to continuously circulating air into the building or to only circulate air when the heating apparatus or the cooling apparatus is actuated. Other controllers are also within the scope of the present invention including, but not limited to, a touch screen controller. A thermostat 10 having more than two controllers is within the scope of the present invention.

The LCD display screen 66, the first set of push buttons 68 and the second set of push buttons 70, or any other controller, while required to operate the thermostat 10, adversely affect the aesthetic impact appearance of the room. Therefore, when the setpoint has been selected as well as the mode of operation, the control panel 64 is rotated back into the cavity 42 in the mounting bracket 32 to conceal the control panel 64 from view. With the control panel 64 concealed from view, the viewing panel 20 of the control module 18 is visible along with the face plate 16.

The viewing panel 20 may optionally include a display screen for determining the ambient temperature without having to manipulate the control module 18. The display screen should be of a size, configuration and brightness as to not adversely affect the aesthetic impact of the room.

Figure 6:
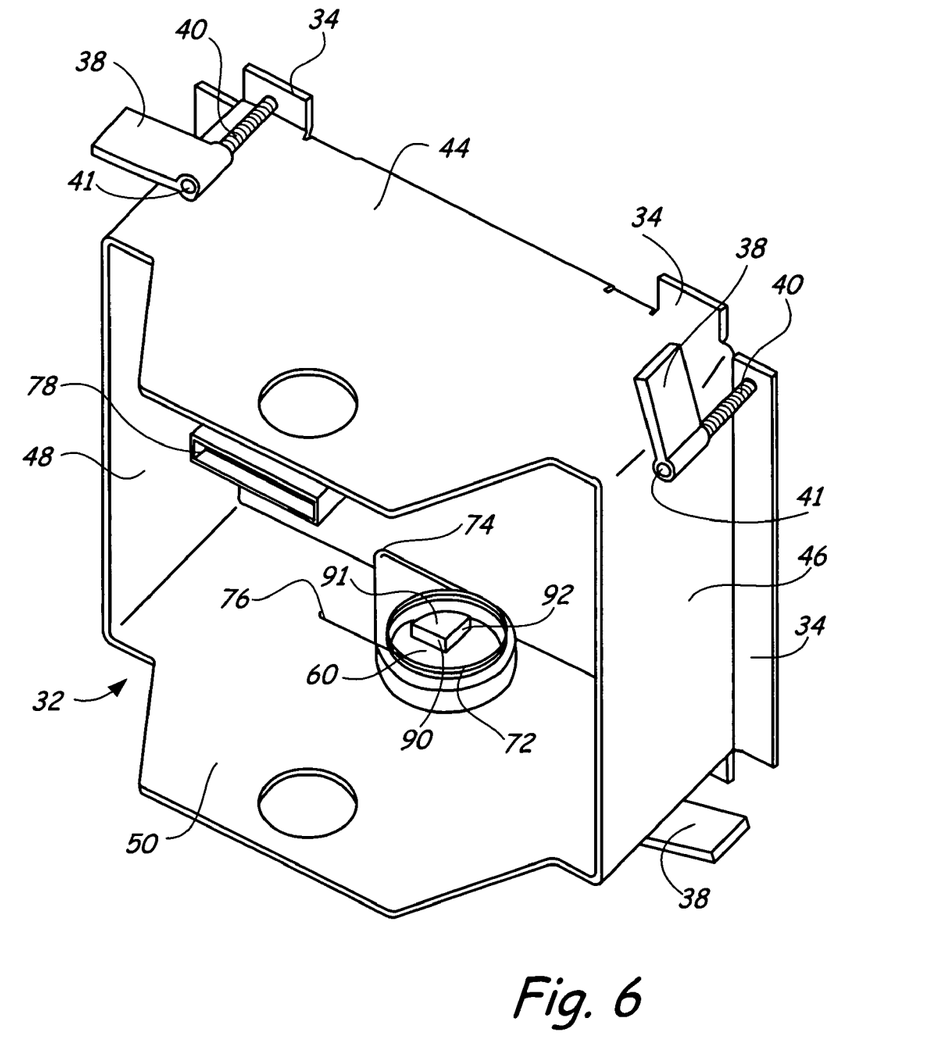
FIG. 6 is another perspective view of the mounting bracket of the present invention viewed from a backside thereof.

Referring to FIGS. 1, 1A and 6, when the desired adjustments have been made on the control panel 64, the control panel 64 is concealed from view within the mounting bracket 32 by depressing the push button 82 by overcoming the bias of a compression spring 83 and disengaging the latch 84 from the second slot 51 in the bottom peg 54. Manual force is applied to the control module 18 in an opposite rotational direction to overcome the bias of the coil spring 72 and rotate the control module 18 about the vertical axis 19. The control module 18 is rotated in the opposite direction until a second surface 88 of the pie shaped wedge 87 of the bottom peg 54 engages a second surface 92 of the pie shaped wedge 91 of the mounting bracket 32 as best illustrated in FIG. 1A.

With the second surfaces 88, 92 abutting, the latch 84 is aligned with and engages the first slot 53 to prevent the coil spring 72 from uncoiling and retaining the viewing panel 20 in a viewable position while concealing the control panel 64. As the control module 18 is rotated, the coil spring 72 coils about the bottom peg 54, or loads. When access to the control panel 64 is needed, the operator depresses the push button 82 by overcoming the bias of the compression spring 83 and disengage the latch 84 from the first slot 53 and the coil spring 72 biases the control panel 64 into the accessible position.

It is also within the scope of the present invention for the control module 18 to be slidably retained within the mounting bracket 32 where a control panel 64 is accessible by sliding the control module 18 away from the wall 12 and where the control panel 62 is concealed by sliding the control module 18 into the cavity 42 in the mounting bracket 32. Other movable connections of the control module 18 are also within the scope of the present invention provided the control module 18 is movable to access the control panel 64 to make control adjustments and where the control module 18 is movable in an opposite direction to conceal the control panel 64 from view when adjustments have been completed. However, it is within the scope of the present invention to conceal the control panel by rotating the control module in the same direction essentially completing a revolution.

Wires (not shown) that provide power to the thermostat, and also provide signals from the thermostat to a HVAC equipment, are positioned through a bore (not shown) that extends from the top peg 52 and into an interior of the control module 18. Ends of the wires are connected to terminals that are connected to the first and second set of controllers as well as a terminal that provides power to the thermostat 10. The wires are also connected to a connecting strip 78 proximate the top wall 44 of the mounting bracket 32. Additional wires (not shown) are attached to the connecting strip 78 to complete circuits that provide power to the thermostat 10 as well as send signals to the HVAC equipment. It is also within the scope of the present invention for the climate controller to be powered by a dry cell battery.

The wires are fixedly attached to the internal terminals within the control module 18. Therefore, the control module 18 cannot be rotated through several revolutions without potentially causing the wires to twist which creates tension and causes the wires to disconnect from the terminals, thereby causing the thermostat to fail. Alternatively, the terminals may be rotatably connected to the control module 18 to eliminate the issues caused by twisting wires.

The cavity 42 in the mounting bracket 32 has a generally square or rectangular perimeter. However, other mounting brackets 32 having cavities with differently shaped perimeters are also within the scope of the present invention including, but not limited to, a circular perimeter, an elliptical perimeter and a polygonal perimeter having symmetric sides. Any geometrically configured mounting bracket 32 and similarly configured control module 18 are within the scope of the present invention provided the control module 18 is positionable within the mounting bracket 32 to conceal the control panel 64 while allowing the viewing panel 20 to be visible within the room.

The control panel 64 and the viewing panel 20 are preferably substantially flat and parallel to each other. However other geometric configurations of the viewing panel 20 and the control panel 64 are also within the scope of the present invention including any angle defined by the abutting viewing panel 20 and the control panel 64 or where the planes defining the control panel 64 and the viewing panel 20 are non-parallel.

Depending upon the degree of rotation of the control module 18 that is required, angles of the pie shaped stops 87, 91 are modified. The angles of the pie shaped stops 87, 91 are decreased to increase the degrees of rotation of the control module 18. Alternatively, the angles of the pie shaped stops 87, 91 are increased to decrease the degrees of rotation of the control module 18. The first and second slots 53, 51 in the bottom peg 54 are also positioned at the required angular positions to allow the control module 18 to rotate through the selected degrees of rotation and retained in selected positions with the engagement with the latch 84.

Figure 8:
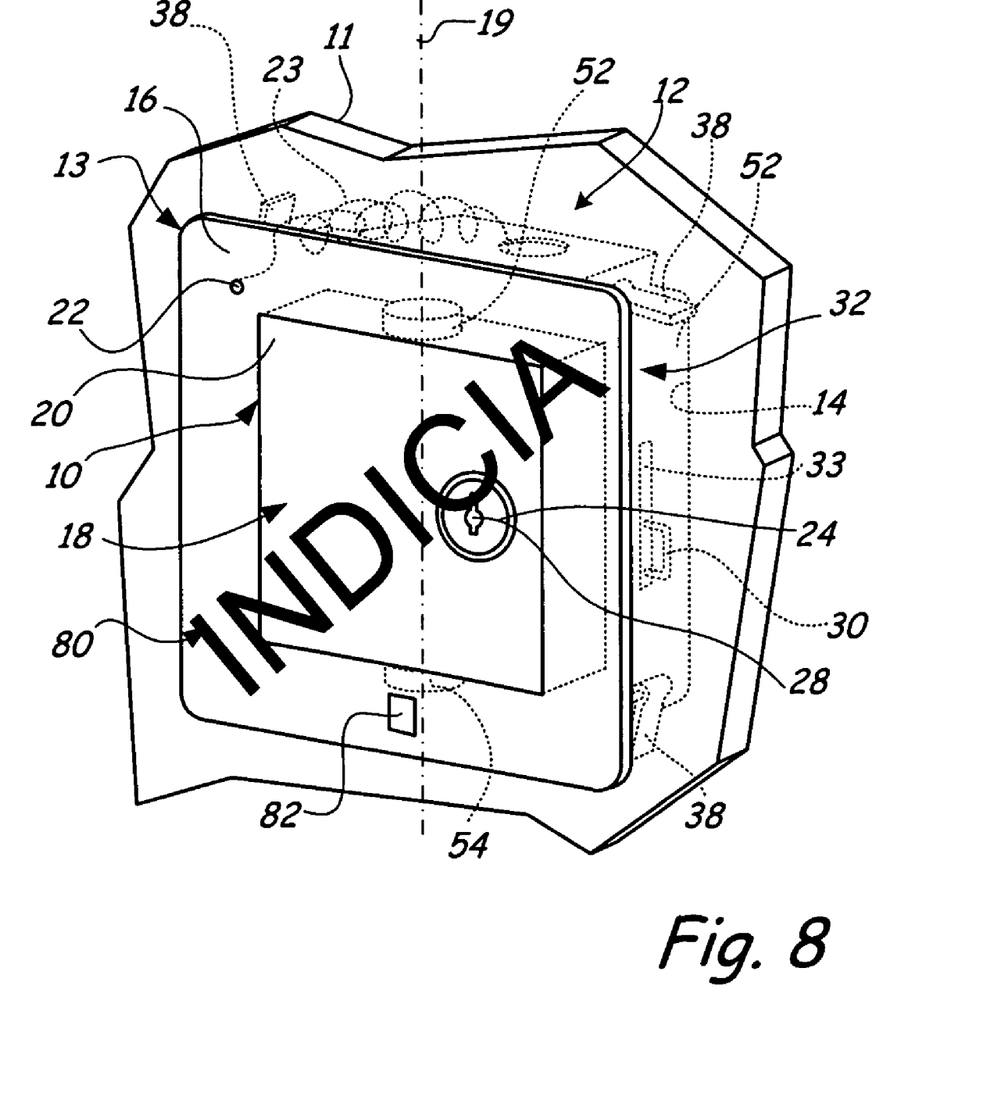
FIG. 8 is a perspective view of the climate controller of the present invention having a non-movable sensor.

Referring to FIGS. 1 and 8, indicia 80 may also be placed upon the faceplate 16 and the viewing panel 20 of the control module 18 to make the thermostat 10 more aesthetically pleasing on the wall. By indicia 80 is meant any distinctive mark or design. The indicia 80 may include a design painted on the faceplate 16, and the viewing panel 20 provided the capabilities of the sensor 20 are unaffected. Further indicia 80 include wall paper that matches wall paper on the wall 12, provided the control module 18 is able to rotate and the capabilities of the sensor 22 are unaffected. Other indicia are also within the scope of the present invention including architectural finishes, such as a wood or metal finish.

Figure 7:
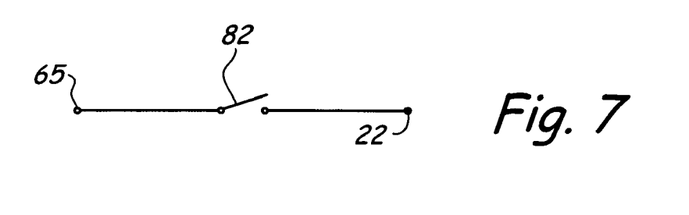
FIG. 7 is a schematic view of a switching mechanism for controlling two temperature sensors of the present invention.

Referring to FIGS. 1, 3 and 7, the thermostat 10 may also have two temperature sensors 22, 65 on the control panel 64 and the viewing panel 20, respectively. A switch 82 energizes one sensor or the other depending upon the position of the control module 18. The sensor 65 on the control panel 64 may be required if the operation does not rotate the control module 18 so that the viewing panel 20 is visible. If the viewing panel 20 is within the cavity 42 in the mounting bracket 32, the sensor 22 may not provide an accurate temperature. However, with the dual sensor 22, 65 configuration with the switch 82 energizing one sensor and de-energizing the other, this potential problem is eliminated.

Referring to FIG. 8, the sensor 22 may also be fixedly mounted in a selected position, such as within the faceplate 16. However, other remote locations of the sensor 22 are also within the scope of the present invention.

The sensor 22 is connected to the control module 18 by a flexible connector 23, such as a coiled wire, that communicates or transmits the signal from the sensor 22 to the control module 18. The flexible connector 23 expands and contracts as the control module 18 rotates, and thereby allows for the rotational movement of the control module 18.

Although the present invention has been described with reference to preferred embodiments, workers skilled in the art will recognize that changes may be made in form and detail without departing from the spirit and scope of the invention.

What is claimed is:

1. A climate controller for mounting to a wall of a building having an exterior surface and an interior surface, the climate controller comprising:
   a mounting bracket for recessing within the wall and having a cavity therein;
   a faceplate mounted to the mounting bracket and having an opening aligned with the cavity and wherein the face place is juxtaposed an exterior surface of the wall; and
   a control module positionable within the mounting bracket and wherein the control module comprises a control panel and wherein when the control module moves in a first direction to access the control panel through the opening in the faceplate and the control module moves in an opposite direction such that the control panel is concealed from view through the opening such that a visual impact of the climate controller in relation to the wall is minimized, wherein the control module further comprises a temperature sensor within a viewing panel of the control module that senses a temperature proximate the wall.

2. The climate controller of claim 1 and wherein the viewing panel substantially aligns with the faceplate to form a substantially uninterrupted surface that minimizes the visual impact of the climate controller in relation to the wall when the control panel is concealed from view.

3. The climate controller of claim 2 and wherein the viewing panel comprises a substantially flat surface.

4. The climate controller of claim 1 and wherein the control panel comprises:
   a display screen; and
   at least one controller for adjusting a temperature setpoint.

5. The climate controller of claim 4 and wherein the control panel comprises:
   a first controller for adjusting the temperature setpoint; and
   a second controller for actuating a plurality of HVAC equipment that heat, cool and circulate air.

6. The climate controller of claim 1 and wherein the control module rotatably mounts to the mounting bracket.

7. The climate controller of claim 1 and further comprising a spring engaging the control module and biasing the control panel to be concealed from view through the opening in the faceplate.

8. The climate controller of claim 1 and wherein the control module rotates about 180 degrees within the mounting bracket.

9. The climate controller of claim 1 and further comprising a locking mechanism for retaining the control module in a selected position wherein the control panel is concealed from view.

10. An HVAC controller for mounting to a wall of a building comprising:
   a mounting bracket for recessing within the wall and having a cavity therein;
   a control module positionable within the cavity and having a control panel and wherein the control module is positionable in a first position wherein the control panel is positioned within the cavity and is inaccessable and a second position wherein the control panel is accessable within the mounting bracket, wherein the control module further comprises a temperature sensor within a viewing panel of the control module that senses a temperature proximate the wall; and
   a locking mechanism engaging the control module and the mounting bracket and wherein the locking mechanism is positionable between a locked position wherein the control module is fixed in the first position wherein the control panel is inaccessible and an unlocked position wherein the control assembly is movable to the second position wherein the control panel is accessible.

11. The HVAC controller of claim 10 and wherein the control module is rotatably mounted to the mounting bracket.

12. The HVAC controller of claim 10 and wherein the control panel further comprises:
   a display screen; and
   at least one controller for controlling a temperature setpoint.

13. The HVAC controller of claim 12 and wherein the control panel comprises:
   a first controller for adjusting the temperature setpoint; and
   a second controller for actuating a plurality of HVAC equipment that heat, cool and circulate air.

14. The HVAC controller of claim 10 and wherein the viewing panel substantially aligns with the wall to form a substantially uninterrupted surface that minimizes the visual impact of the HVAC controller in relation to the wall when the control module is positioned in the first position.

15. The HVAC controller of claim 14 and wherein a viewable panel of the control module includes indicia thereon and when the control module is positioned in the first position the indicia minimizes the visual impact of the HVAC controller on the wall.

16. The HVAC controller of claim 10 and further comprising a spring engaging the control module and biasing the control module into the first position.

17. The HVAC controller of claim 10 and further comprising a faceplate attached to the mounting bracket and positioned proximate an exterior surface of the wall.

18. A climate controller for mounting to a wall of a building, the climate controller comprising:
   a mounting bracket for recessing within the wall and having a cavity therein; and
   a control module movably mounted to the mounting bracket within the cavity and wherein the control module comprises a control panel on a first side and a sensor on a second side, wherein the sensor comprises a temperature sensor and wherein when the control module is moved to access the control panel from a concealed position and the control module moves in another direction to conceal the control panel concealed from view within the mounting bracket such that the sensor is viewable and a visual impact of the climate controller in relation to the wall is minimized.

19. The climate controller of claim 18 and wherein the control module rotatably mounts to the mounting bracket.

20. The climate controller of claim 18 and wherein the control panel comprises: a display screen; and at least one controller for adjusting a setpoint.

21. The climate controller of claim 20 and wherein the control panel further comprises:
   a first controller for adjusting the setpoint; and
   a second controller for actuating a plurality of HVAC equipment that heat, cool and circulate air.

22. The climate controller of claim 18 and further comprising a spring engaging the control module and biasing the control panel to be concealed from view through the opening in a faceplate.

23. The climate controller of claim 18 and further comprising a locking mechanism for retaining the control module in a selected position wherein the control panel is concealed from view.

24. A climate controller for mounting to a wall, the climate controller comprising:
   a mounting bracket for recessing within the wall and having a cavity therein;
   a control module movably mounted to the mounting bracket within the cavity and wherein the control module comprises a control panel on a first side having a first sensor and a second side having a second sensor; and
   a switch that energizes one sensor and de-energizes the other sensor depending upon a position of the control module such that only one sensor detects a climate condition at any time depending upon the position of the control module.

25. The climate controller of claim 24 and wherein the control module rotatably mounts to the mounting bracket.

26. The climate controller of claim 24 and wherein the first and second sensors comprise temperature sensors.

27. The climate controller of claim 24 and wherein the control panel further comprises:
   a display screen; and
   at least one controller for adjusting a setpoint.

28. The climate controller of claim 27 and wherein the control panel further comprises:
   a first controller for adjusting the setpoint; and
   a second controller for actuating a plurality of HVAC equipment that heat, cool and circulate air.

29. The climate controller of claim 24 and further comprising a faceplate juxtapose the wall and having an opening aligned with the cavity in the mounting bracket.

30. The climate controller of claim 24 and further comprising a spring engaging the control module and biasing the control panel to be concealed from view with the cavity in the mounting bracket.

31. The climate controller of claim 24 and further comprising a locking mechanism for retaining the control module in a selected position wherein the control panel is concealed from view.

32. A climate controller for mounting to a wall of a building, the climate controller comprising:
   a mounting bracket for recessing within the wall and having a cavity therein;

a control module movably mounted to the mounting bracket within the cavity and wherein the control module comprises a control panel and wherein when the control module moves in a first direction to access the control panel through the opening in the faceplate and the control module moves in an opposite direction such that the control panel is concealed from view through the opening such that a visual impact of the climate controller in relation to the wall is minimized, wherein the control module further comprises a temperature sensor within the viewing panel that senses a temperature proximate the wall; and a faceplate mounted to the wall and having an opening for accessing the control module.

33. The climate controller of claim 32 and wherein the control module rotatably mounts to the mounting bracket.

34. The climate controller of claim 32 and wherein the climate condition is a temperature.

35. The climate controller of claim 32 and wherein the control panel further comprises:

a display screen; and at least one controller for adjusting a setpoint.

36. The climate controller of claim 32 and further comprising a spring engaging the control module and biasing the control panel to be concealed from view with the cavity in the mounting bracket.

37. The climate controller of claim 32 and further comprising a locking mechanism for retaining the control module in a selected position wherein the control panel is concealed from view.

* * * * *